Patented Dec. 10, 1946

2,412,389

UNITED STATES PATENT OFFICE 2,412,389

HALOGENATED ORGANIC COMPOUNDS

Oliver W. Cass, Niagara Falls, N. Y., assignor to E. I. du Pont de Nemours & Company, Wilmington, Del., a corporation of Delaware No Drawing. Application June 18, 1943, Serial No. 491,377

1 Claim. (Cl. 260—651)

This invention relates to the preparation of halogenated organic compounds, more particularly chlorinated hydrocarbons, which are of value as intermediates in chemical synthesis and for other purposes. The invention relates more especially to the preparation of chlorinated aromatic compounds which contain two types of chlorine atoms of different reactivity. The new chemical compounds with which this invention is concerned are thus characterized by containing relatively non-reactive chlorine attached to the nucleus of the aromatic organic compound, and highly reactive chlorine atoms present in aliphatic side chains attached to the aromatic nucleus. When such compounds are utilized as reagents in chemical synthesis the highly reactive chlorine atoms in the alkyl side chains are replaced by other groups, while the comparatively unreactive nuclear chlorine atoms remain in the molecule. In this way, these novel halogenated compounds offer a convenient route to a large number of useful halogenated compounds.

The chlorinated aromatic compounds with which this invention is particularly concerned are further characterized as belonging to that class of compounds known as alpha-omega dihalides, compounds which have usually been hitherto available commercially for use in chemical synthesis only at relatively high cost.

The new chemical compounds with which this invention is concerned may be further characterized as nuclear chlorinated p-xylylene dichlorides containing from 1 to 4 chlorine atoms substituted for nuclear hydrogen atoms of the benzene ring and containing, in addition, two non-nuclear chlorine atoms, one substituted in each of the two methyl groups attached to the benzene ring in the p-position. The new chemical compounds, the nuclear chlorinated p-xylylene dichlorides, may be represented by the following formulae:

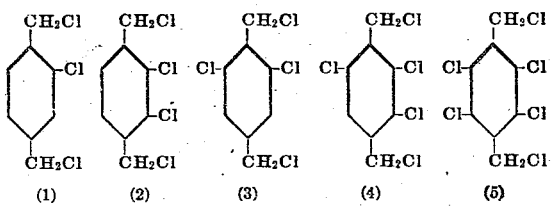

(1)  (2)  (3)  (4)  (5)

Accordingly, it is one of the objects of this invention to prepare from a commercially available starting material, the hydrocarbon p-xylene, various new chlorinated aromatic compounds characterized by containing two types of chlorine, i. e. both non-reactive nuclear substituted chlorine, and reactive chlorine present in the alkyl side chains attached in the p-position to the benzene ring. Another object of this invention is the preparation by chlorination methods of these new chlorinated aromatic compounds, valuable as intermediates in chemical synthesis and for other purposes, these compounds being generally characterized as alpha-omega dihalides. Still another object of this invention is the preparation, by chlorination of p-xylene in a series of successive steps or operations, of nuclear chlorinated p-xylylene dichlorides containing up to four chlorine atoms replacing the nuclear hydrogen atoms of the benzene ring. These and still further objects of my invention will be apparent from the ensuing disclosure of certain preferred embodiments thereof.

I have found that p-xylene will react smoothly with chlorine in the presence of a chlorination catalyst to yield various chlorinated reaction products which may be easily isolated from the reaction mixture in a high state of purity. I have also found that these chlorinated products may subsequently be reacted with chlorine in the presence of actinic radiation to produce therefrom chlorinated products of higher chlorine content. By thus proceeding in a series of stepwise chlorinations I have found that p-xylene may be readily converted to the nuclear chlorinated p-xylylene dichlorides which it is the principal object of this invention to produce.

Gaseous chlorine may be brought into contact with p-xylene, either alone or suspended in some inert diluent such as carbon tetrachloride, in the presence of any of the usual chlorination catalysts. Among suitable catalysts of this well known type may be mentioned iron filings, or ferric chloride. The reaction may be carried out either at room temperature or above, but ordinarily I prefer to maintain the reaction mixture at a temperature below about 60° C. by the application of suitable cooling means in order that the reaction may not become too violent. In order to initiate the reaction it may be necessary to heat the reaction mixture at the beginning to a temperature in the range 40° C. to 60° C.

From the product prepared by reacting p-xylene with chlorine the intermediate chlorine-containing products may be readily separated in a very pure state by fractional distillation and reintroduced into a reaction vessel for further reaction with chlorine in the presence of actinic radiation supplied by a suitable light source such as a tungsten filament bulb. In continuing the chlorination in this manner conditions substantially the same as those maintained during the chlorination of the p-xylene may be employed, except that there is no catalyst present, the reaction proceeding in the presence of actinic radiation. Thus, the reaction may be carried out by passing chlorine gas into the products of intermediate chlorination, either alone or suspended in some inert organic diluent such as carbon tetrachloride. The temperature utilized may be kept below 60° C. by cooling in order to avoid too violent a reaction. Chlorination catalysts are employed for introducing nuclear chlorine, while chlorine is substituted for hydrogen in the aliphatic side chains by reacting with chlorine in the presence of actinic radiation.

In carrying out the procedure industrially it is convenient to employ a reaction vessel fitted with a stirrer, a reflux condenser with an attached scrubbing system for removing the evolved hydrogen chloride, and means for heating or cooling the contents of the apparatus. For the chlorination of products of intermediate chlorine content the vessel should preferably be provided with a well formed of transparent, heat-resistant glass to permit irradiation of the contents of the reaction vessel by means of a suitable light source.

The invention is illustrated by the following examples:

*Example 1*

2120 parts of p-xylene and 60 parts of metallic iron in the form of fine iron filings as catalyst were placed in a reaction vessel fitted with a stirrer, a reflux condenser, a thermometer well and thermometer, an inlet tube for chlorine, and a jacket by which the contents of the reaction vessel could be heated or cooled. The reflux condenser was provided with a scrubbing system for collecting or absorbing the hydrogen chloride evolved and unreacted chlorine.

Operation of the stirrer was begun and chlorine gas was passed into the contents of the reaction vessel as rapidly as it was completely absorbed therein. During this period the reaction temperature rose to 60° C., at which point cooling was started by circulating cooling water through the jacket of the apparatus. Passage of chlorine into the apparatus was continued until 1420 parts of chlorine had been introduced and substantially completely absorbed as shown by the liberation of approximately 720 parts of hydrogen chloride.

The supply of chlorine was now stopped and the contents of the reaction vessel decanted to remove the iron catalyst. By fractionally distilling the reaction product it was found that the major portion distilled between 180° C. and 185° C. and consisted primarily of 2-chloro-p-xylene. The higher boiling fractions, which constituted somewhat less than 12% of the total reaction mixture, consisted essentially of 2,5-dichloro-p-xylene and 2,3-dichloro-p-xylene.

The 2-chloro-p-xylene fraction was purified by careful fractionation whereby there was secured a fraction of constant boiling point having an atmospheric boiling point of 182° C. 1405 parts of this material together with 7690 parts of carbon tetrachloride as diluent were then charged into a glass-lined reaction vessel fitted with a stirrer, a reflux condenser, a thermometer well, a transparent glass well through which light for irradiation of the contents of the reaction vessel could be supplied, an inlet tube, and means for heating and cooling the contents of the reaction vessel. The mixture was heated to reflux temperature and subjected to irradiation by means of the light from a tungsten filament light bulb placed within the transparent light well.

A stream of gaseous chlorine was now introduced into the reaction vessel until a total of 1280 parts of chlorine had been fed in and reacted with the 2-chloro-p-xylene as shown by the simultaneous liberation of 662 parts of hydrogen chloride. The contents of the reaction vessel were cooled and transferred to a still wherein the carbon tetrachloride diluent was stripped from the reaction product by distillation.

The reaction product was now subjected to careful fractionation at a pressure less than atmospheric. The desired product recovered therefrom, 2-chloro-p-xylylene dichloride, boiled at 159 to 161° C. at 20 millimeters of mercury pressure, and solidified at room temperature to a mass of colorless needle-like crystals having a sharp melting point of 49 to 49.5° C. The only other material found in the reaction mixture in appreciable amounts was monochloro-p-xylyl chloride which was recycled in subsequent chlorinations to form additional amounts of the desired 2-chloro-p-xylylene dichloride (Product 1 above).

By recycling the low boiling compounds and continuing chlorination under the conditions above described there were obtained from the original p-xylene yields of 2-chloro-p-xylylene dichloride in the neighborhood of 90% of theoretical.

The amount of chlorine present in the aliphatic side chains of 2-chloro-p-xylylene dichloride is readily determined in the usual manner by refluxing a weighed sample of the compound with a standard solution of sodium methylate in absolute methanol, and determining the amount of chloride ion thus produced. Tests showed that the amount of hydrolyzable (side chain) chlorine was 33.56%, which agrees very closely with the theoretical non-nuclear chlorine content of 33.87%.

*Example 2*

By following the procedure described in Example 1 above, utilizing the same apparatus, 2120 parts of p-xylene and 60 parts of iron filings were charged into a reaction vessel. While the contents were maintained at a temperature of 60 to 100° C. chlorine gas in the amount of 2810 parts was introduced. Substantially all of the chlorine reacted with xylene with the liberation of hydrogen chloride and the formation of nuclear chlorinated p-xylene. By fractional distillation of the reaction product there was isolated a fraction comprising a mixture of 2,5-dichloro-p-xylene and 2,3-dichloro-p-xylene, this fraction boiling between 218° C. and 222° C. The lower boiling materials consisted practically entirely of 2-chloro-p-xylene which could be recovered by fractional distillation and subsequently rechlorinated to yield higher chlorinated products. The higher boiling materials, which constituted less than 15% of the total reaction product, consisted mainly of 2,3,5-trichloro-p-xylene, and this compound could be separated as such and utilized for various purposes.

The lower boiling material was recycled in the same reaction vessel, additional amounts of chlorine being supplied thereto. There was secured in this way a mixture of 2,5-dichloro-p-xylene and 2,3-dichloro-p-xylene in yields approximating 80 to 85% of the theoretical. While it is frequently not necessary to separate these two isomeric nuclear chlorinated dichloro xylenes, separation can readily be accomplished by fractional distillation and crystallization if desired. In this way a yield of approximately 50% of pure 2,5-dichloro-p-xylene melting at 67 to 69° C. was secured, as well as a liquid which was essentially the eutectic mixture of the two dichloro-p-xylenes.

By following the procedure described in Example 1 above, chlorination in the glass-lined vessel in the presence of actinic radiation, it was possible to secure the desired higher boiling products. Pure 2,5-dichloro-p-xylene in the amount of 1405 parts and 7690 parts of carbon tetrachloride diluent were charged into the glass-lined reaction vessel, radiation begun, and 1277 parts of chlorine introduced. The chlorine was substantially completely utilized, and at the end of the reaction there was secured by fractional distillation of the reaction product 1442 parts of 2,5-dichloro-p-xylylene dichloride which boiled at 174° C. at 20 millimeters of mercury pressure and crystallized as colorless plates or prisms melting at 97 to 99° C. The only by-product obtained in substantial amount during this second stage chlorination was the intermediate 2,5-dichloro-p-xylyl chloride which was recycled in subsequent chlorinations to give an overall yield of the desired 2,5-dichloro-p-xylylene dichloride approximating 90% of the theoretical.

Analysis of the product for hydrolyzable chlorine gave a value closely approximating the theoretical value of 29.9%.

*Example 3*

By following the procedure of Example 1, 2120 parts of xylene and 60 parts of metallic iron as catalyst were charged into a reaction vessel. Chlorine in the amount of 4390 parts was then introduced in small successive increments, cooling means being provided to maintain the reaction temperature at approximately 100° C. The evolution of 2235 parts of hydrogen chloride was evidence of substantially complete utilization of the chlorine introduced, whereupon the product was subjected to fractional distillation.

The major constituent found on fractionally distilling the reaction mixture was 2,3,5-trichloro-p-xylene, this compound boiling sharply at 254–255° C. at atmospheric pressure. It solidified to give a crude product melting at approximately 91° C. The only by-products were lower chlorinated materials which were later recycled and converted to chlorinated compounds of higher chlorine content and a small amount, less than 10%, of tetrachloro-p-xylene boiling above 285° C. The yield upon continuous operation of the process was 90% of the theoretical.

By following the procedure described in Example 1, 2050 parts of trichloro-p-xylene and 7690 parts of carbon tetrachloride as diluent were introduced into a glass-lined reaction vessel. The contents of the reaction vessel were heated to reflux and irradiated with light from a tungsten filament incandescent light while chlorine gas in the amount of 1275 parts was introduced into the reaction mixture.

The carbon tetrachloride was then removed by fractional distillation, whereupon the residue was subjected to vacuum fractionation. This resulted in a product the major portion of which boiled at 182 to 187° C. under 30 millimeters of mercury pressure, and melted between 78° C. and 87° C. This product was trichloro-p-xylylene dichloride. By recrystallizing this material from the solvent there was secured a product having the sharp melting point of 86 to 87° C. The only by-product present in any appreciable amount was the intermediate trichloro xylyl chloride which was recycled in subsequent chlorination to yield the desired xylylene dichloride product. By continuously operating in this manner, reworking lower chlorinated material, yields approaching the theoretical were secured. Analysis of the product for hydrolyzable chlorine compared very favorably with the theoretical value for trichloro-p-xylylene dichloride.

*Example 4*

The procedure of Example 3 was followed to prepare a product comprising essentially tetrachloro-p-xylene. When the quantity of chlorine required for the preparation of the trichloride had been introduced the reaction was interrupted and 100 parts of carbon tetrachloride diluent was added for each 100 parts of xylene originally present at the beginning of the chlorination. By adopting this procedure it was possible to keep the contents of the reaction mixture in the semifluid state during subsequent operations.

A solution of chlorine in carbon tetrachloride was then added to the stirred reaction mixture which was maintained at the reflux temperature until the theoretical quantity of chlorine necessary to convert the product to the tetrachloride had been introduced. Under these conditions the reaction mixture could be stirred during introduction of the chlorine. The carbon tetrachloride was then removed in a stripping still and the reaction product subjected to careful fractionation.

The major fraction consisted of tetrachloro-p-xylene boiling at 289 to 293° C., together with a minor amount of a material which was a mixture of trichloro-p-xylene and tetrachloro-p-xylene. This mixture could subsequently be reacted with chlorine in further chlorination reactions to yield the desired higher-chlorinated product. The amount of unusable high boiling residues was less than 10% thus making the yield of 2,3,5,6-tetrachloro-p-xylene equivalent approximately to 90% of the theoretical.

By following the procedure of Example 1, 2439 parts of tetrachloro-p-xylene together with 9228 parts of carbon tetrachloride as diluent were introduced into a glass-lined reaction vessel. The contents of the reaction vessel were heated to the reflux temperature and a total of 1350 parts of chlorine introduced while the contents of the reaction vessel were subjected to the radiation from a tungsten filament light bulb. After stripping the carbon tetrachloride from the reaction mixture the product was subjected to careful fractional distillation under reduced pressure and gave, as the principal constituent, tetrachloro-p-xylylene dichloride boiling at 220° C. at 30 millimeters of mercury pressure and melting sharply at 179° C. The only by-product present in any appreciable amount was tetrachloro-p-xylyl chloride boiling at 198° C. at 30 millimeters of mercury pressure and melting sharply at 110° C. This latter compound was recycled in subsequent runs to make the overall yield of the desired tetrachloro-p-xylylene dichloride practically quantitative.

Analysis of the tetrachloro-p-xylylene dichloride for hydrolyzable chlorine gave a value which was very close to the theoretical value for that compound. Analysis of the chlorine content of the by-product indicated that material was tetrachloro-p-xylyl chloride.

That the dichlorides secured in Examples 1, 2, 3, and 4 above were xylylene dichlorides and not xylylidene dichlorides was established by hydrolyzing small samples. The absence of aldehydes in the hydrolyzed material in every case indicated that the halogen atoms in the side chain were present as monochloro substituents in the two methyl groups.

I claim:

Monochloro para-xylylene dichloride.

OLIVER W. CASS.